E. C. SHAW.
DISK OILER.
APPLICATION FILED APR. 4, 1910.
1,000,349.
Patented Aug. 8, 1911.
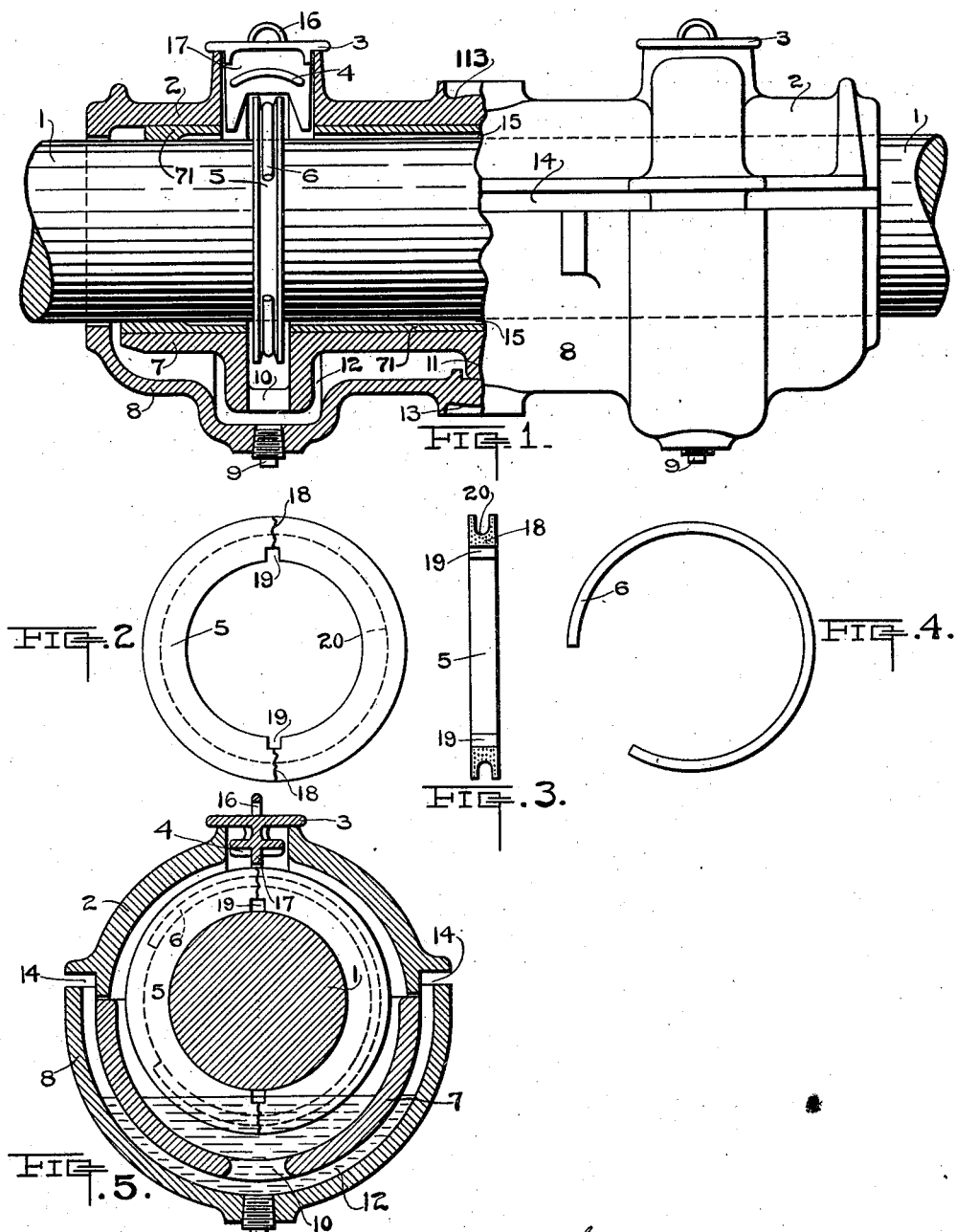

UNITED STATES PATENT OFFICE.

ERNEST C. SHAW, OF MILWAUKEE, WISCONSIN, ASSIGNOR TO ALLIS-CHALMERS COMPANY, OF MILWAUKEE, WISCONSIN, A CORPORATION OF NEW JERSEY.

DISK OILER.

1,000,349.            Specification of Letters Patent.      Patented Aug. 8, 1911.

Application filed April 4, 1910. Serial No. 553,181.

*To all whom it may concern:*

Be it known that I, ERNEST C. SHAW, a citizen of the United States, residing at Milwaukee, in the county of Milwaukee and State of Wisconsin, have invented a certain new and useful Improvement in Disk Oilers, of which the following is a specification.

This invention relates to improvements in the construction of lubricating devices, and in particular to improvements in the construction of disk oilers for shaft bearings.

The object of the invention is to provide a disk oiler for shaft bearings which is simple in its construction and efficient in its operation.

A clear conception of one embodiment of the invention can be obtained by referring to the accompanying drawing in which like reference characters designate the same or similar parts in like or different views.

Figure 1 is a side elevation of a bearing having a disk oiler built in accordance with the invention, applied thereto, a portion of the bearing and oil casing being shown in section. Fig. 2 is a plan view of an oil disk such as is shown in the device illustrated in Fig. 1. Fig. 3 is a side view of half of the disk shown in Fig. 2, looking toward the break which separates the disk halves. Fig. 4 is a plan view of a snap ring such as is used to hold the two parts of the disk together. Fig. 5 is a transverse vertical section through the disk portion of the bearing and oil casing of the device shown in Fig. 1.

The shaft 1 is supported directly by the lower shell 7 having the babbitted or bronze bearing lining 71 formed therein, see Fig. 1. The upper shell 2 also has a lining 71 formed therein and coacts with the upper portion of the lower shell 7 and the shaft 1, being fastened to the lower shell 7 in any suitable manner, not shown. The lower shell 7 has a central lug 11 formed thereon, which lug 11 coacts with an upper surface of the bottom of the oil casing 8, thus forming a support for the lower shell 7, shaft 1 and upper shell 2 within the casing 8. The oil casing 8 forms a recess in which the lower shell 7 is located, there being a space between the outer surface of the shell 7 and the inner surface of the oil casing 8 forming an oil chamber 12. A space 14 on either side of the shaft 1 separates the upper shell 2 from the oil casing 8 and forms a connection between the chamber 12 and the atmosphere. The oil casing 8 approaches the shaft 1 at either end of the lower shell 7 and is supported near its center upon a lower spherical surface 13, thus forming a support for all of the bearing elements and for the shaft 1. An upper spherical surface 113 is formed on the upper shell 2 directly above the lower spherical surface 13 of the casing 8, and has the same radius of curvature as that of the surface 13.

The oil disk 5, see Figs. 1, 2, 3, 4, 5, is formed in halves and has a groove 20 extending around its periphery. The notches 19 which project into the disk 5 from the inner surface thereof, are spaced 180 degrees apart and form weakened portions of the disk 5. The brakes 18 extend outwardly from the notches 19 and separate the halves of the disk 5, which halves are normally held together by a snap ring 6 coacting in the groove 20 of the disk 5.

In the bearing shown, see Figs. 1, 5, there are two oil disks 5 mounted on the shaft 1, these disks 5 being placed around the shaft 1, which is of slightly larger diameter than the internal diameters of the disks 5, and held in coaction with the shaft 1 by the snap rings 6. The upper shell 2 is of enlarged diameter opposite the disk to allow the upward extension of the disks 5 therein, and have openings at the tops of the enlarged portions above the disks 5. The deflectors 17 extend down into the openings to within a short distance from the disks 5, and have extensions at the sides of the disks 5 which approach the oil grooves 15 formed in the lining 71 of the upper shell 2. The arc shaped ribs 4 are formed on the deflectors 17, extending laterally therefrom and having their ends directed down toward the extensions at the bottom of the deflectors 17. The caps 3 at the top of the deflectors 17 prevent any foreign matter from dropping into the openings in the upper shell 2 and are provided with handles 16 to permit removal of the deflectors 17.

The lower shell 7 has enlarged portions corresponding to those of the upper shell 2, at the disk sections thereof, which allow the disks 5 to extend downward therein. The enlarged portions of the lower shell 7 have openings 10 near their lower extremities. Oil grooves 15 are formed in the lining 71 of the lower shell 7. The oil casing 8 has enlarged portions formed around the enlarged portions of the lower shell 7, which enlarged portions of casing 8 have drains, normally closed by pipe plugs 9 at their lower extremities.

During the operation of the disk oiler, the casing 8 is provided with oil to a level slightly below the bottom of the shaft 1. The disks 5 extend down into the oil which rises through the openings 10, into the chamber formed within the lower shell 7 and surrounding the lower portion of the disk 5, see Figs. 1, 5.

As the shaft 1 is revolved, carrying with it the disks 5, oil is carried up by the disks 5 to the deflectors 17. Upon reaching the deflectors 17, the oil thus elevated, is brushed off from the disks 5, being transferred to the deflectors 17. Due to the velocity of the disks 5, the oil rises on the deflectors 17 until it strikes the ribs 4, which ribs 4 change the course of the oil, deflecting it toward the sides of the deflectors 17. The deflected oil then passes down toward the shaft 1 under the action of gravity. Upon reaching the shaft 1, a portion of the deflected oil passes into the oil groove 15 at the top of the shaft, the remaining portion being carried back to the casing 8. The oil which enters the oil groove 15 is carried around the shaft 1, thus efficiently lubricating it, and is eventually deposited in the lower oil groove 15, from which it flows back to the casing 8.

The space 14 between the casing 8 and the shell 2 serves as a vent to prevent the formation of a partial vacuum within the chamber 12, above the oil therein, and thus prevents the oil from rising to an abnormal height within the chamber 12.

With the use of a deflector 17, having both sides alike, that is, having two ribs 4, it will be seen that the device will act equally as efficient with either direction of rotation of the shaft 1.

It should be understood that it is not desired to be limited to the exact details of construction shown and described, for obvious modifications will occur to a person skilled in the art.

It is claimed and desired to secure by Letters Patent,—

In an oiler, a shaft, a shell surrounding said shaft and forming a bearing therefor, an oil basin below said shell, a disk formed in segments mounted on said shaft for rotation thereby, portions of said disk being of reduced cross-section and said segments terminating at corresponding fracture surfaces at said portions of reduced cross-section, and said disk having a deep groove formed in its periphery, a snap ring in the bottom of said groove for holding said disk segments together and on said shaft, and a deflector held in said shell above and in contact with said disk but free from contact with said snap ring.

In testimony whereof, I affix my signature in the presence of two witnesses.

ERNEST C. SHAW.

Witnesses:
H. C. CASE,
W. H. LIEBER.

---

Copies of this patent may be obtained for five cents each, by addressing the "Commissioner of Patents, Washington, D. C."